United States Patent [19]
Howard

[11] 3,728,726
[45] Apr. 17, 1973

[54] TRACKING RADAR FEED CIRCUITRY
[75] Inventor: Dean D. Howard, Oxon Hill, Md.
[73] Assignee: The United States of America as represented by the Secretary of the Navy
[22] Filed: Nov. 12, 1969
[21] Appl. No.: 870,565

[52] U.S. Cl. .............................................. 343/16 M
[51] Int. Cl. ................................................ G01s 9/22
[58] Field of Search ................................... 343/16 M

[56] References Cited
UNITED STATES PATENTS
3,568,190   3/1971   Wong.................................343/16 M

*Primary Examiner*—T. H. Tubbesing
*Attorney*—R. S. Sciascia, Arthur L. Branning and J. G. Murray

[57] ABSTRACT

A monopulse tracking radar which includes a four-horn diamond feed and wherein the radiated power is doubled by the use of two separate feed lines.

6 Claims, 2 Drawing Figures

TRACKING RADAR FEED CIRCUITRY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In prior monopulse tracking radar, the effective range and the tracking precision were often limited by the rf power capability of the antenna feed which, in turn, was usually determined by the rf power level that could be supported, without breakdown, by the feed components such as the duplexer, etc. Although the rf power has been split in the feed system of some prior monopulse tracking radars, complex circuitry was required to avoid antenna boresight altering because of phase variations which were introduced by the power division.

SUMMARY OF THE INVENTION

The present invention improves on prior monopulse tracking radar by using a four-horn diamond antenna feed together with two separate rf power lines with individually feed the orthogonal pair of horns. The separate rf power lines each operate at the rf power level of the feed line components, thereby allowing the radiated power to be doubled with an accompanying increase in the operative capability of the radar.

OBJECTS

An object of the present invention is, therefore, to provide an improved monopulse tracking radar.

Another object is to provide an improved monopulse tracking radar which includes antenna feed and feed circuitry that allows the radiated power to be doubled.

A still further object is to provide an improved monopulse tracking radar which includes a four-horn diamond feed and two separate feed lines and means that allow the radar radiated power to be doubled.

DESCRIPTION OF THE DRAWINGS

Other objects and features of the invention will become more apparent to those skilled in the radar art from the following description and the annexed drawings wherein.

DESCRIPTION OF THE INVENTION

Figure 1:
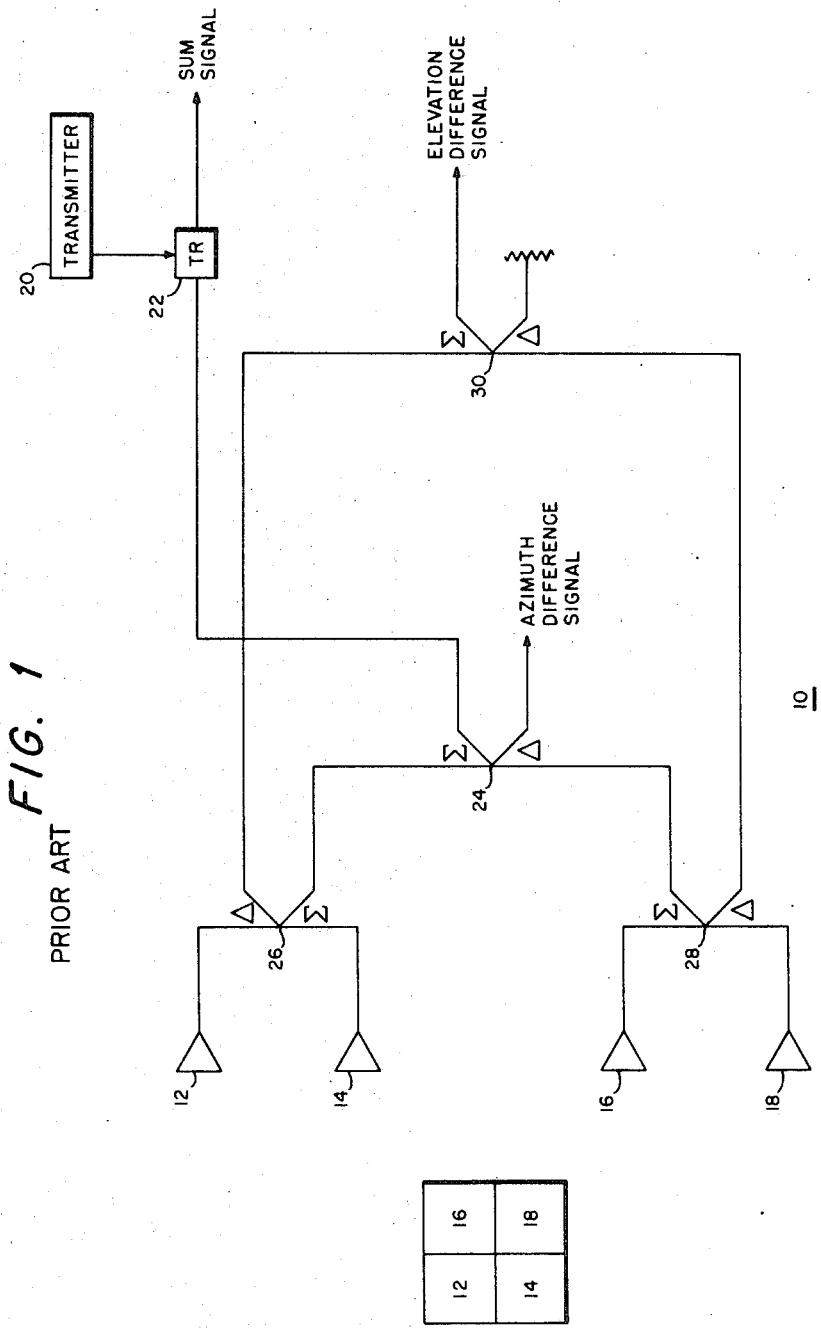
FIG. 1 shows a typical prior monopulse tracking radar.

Referring now to FIG. 1 which shows a typical prior and well known monopulse tracking radar 10 wherein the four-horn square feed arrangement 12, 14, 16 and 18 is energized by a transmitter 20 through the TR or duplexer device 22 and the hybrid junctions 24, 26, and 28. The energy reflected from a target and intercepted by the antenna (not shown), and directed thereby into the horns 12, 14, 16 and 18, is processed in the well known manner.

The receiver (not shown) is provided a sum signal by way of TR device 22. This sum signal, which is used for target range determination and as a reference signal, is obtained by summing the energy from horns 12 and 14 in hybrid junction 26 and from horns 16 and 18 in hybrid junction 28 and by further combining these summed energies in the hybrid junction 24. The receiver is also provided an azimuth difference (error) signal which is nulled when the target is precisely aligned in azimuth with the antenna boresight. This azimuth difference signal is obtained from hybrid junction 24 as the difference between the sum signals from hybrid junction 26, ie. the combined energies from horns 12 and 14, and the sum signal from hybrid junction 28, ie. the combined energies from horns 16 and 18. The receiver is also provided with an elevation difference (error) signal which is nulled when the target is precisely aligned in elevation with the antenna boresight. The elevation difference signal is obtained from hybrid junction 30 as the sum of the difference signals from hybrid junctions 26 and 28, ie. as the sum of the differences between the energies in horns 12 and 14 and in horns 16 and 18. The reader will, of course, realize that both the transmitted power and the received energies are at rf.

In connection with the prior monopulse tracking radar 10 of FIG. 1, the readers' attention is particularly directed to the circumstance that all transmitted power must pass through TR (duplexer) device 22, hybrid junction 24 and the waveguide connection therebetween. The power level limitations (ie. without breakdown) of these components is usually the design consideration that, as a practical matter, determines the effective range and tracking precision of the radar.

To energize the pairs of horns 12, 14 and 16, 18 separately, ie. through two TR devices, would require complex circuitry which, in effect, would provide essentially identical phase characteristics in the path between hybrid junction 26 and 24 and the path between hybrid junctions 28 and 24. This requirement exists because the azimuth difference signal necessarily includes the critical phase comparison of the signals received at hybrid junction 24 from the sum outputs of hybrid junctions 26 (energy in horns 12 and 14) and 28 (energy in horns 16 and 18). Any phase error introduced by the paths between the hybrid junctions 26, 24 and 28, 24 into this phase comparison moves the electrical axis of the antenna and directly diminished the tracking accuracy of the radar.

Figure 2:
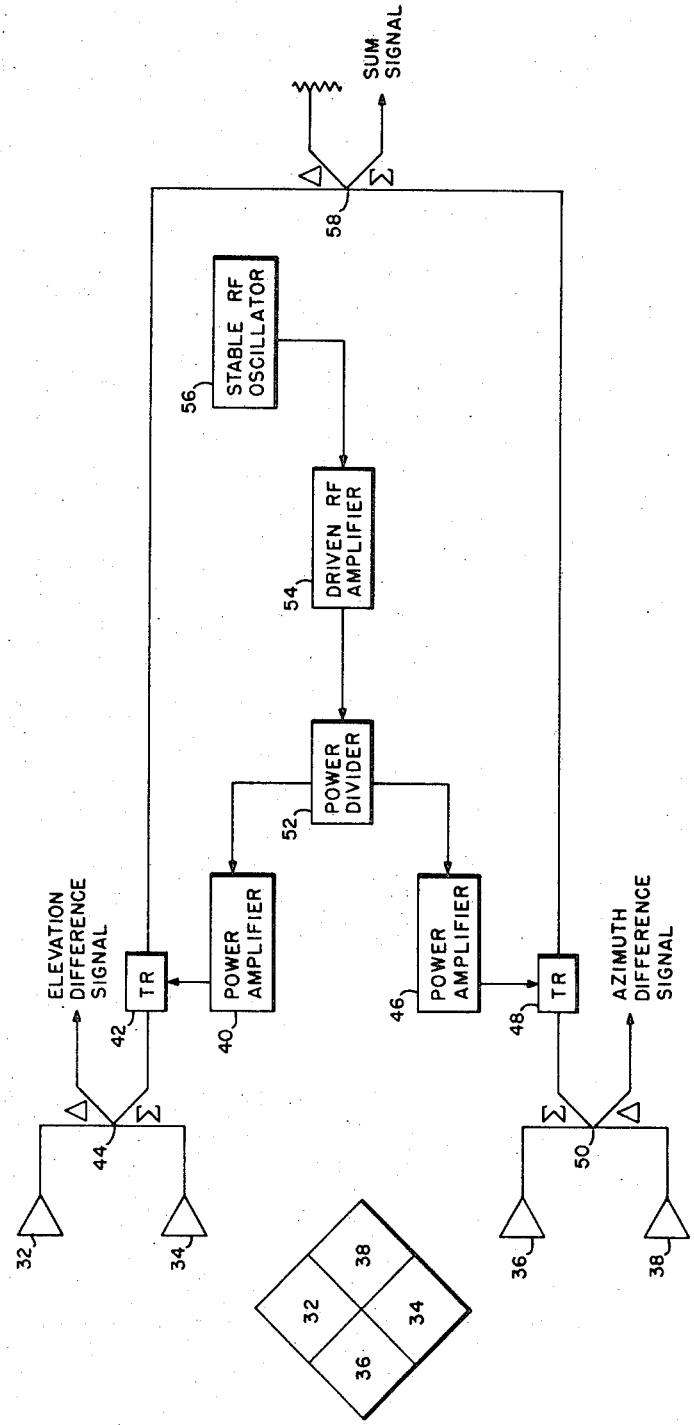
FIG. 2 illustrates the preferred embodiment of the present invention.

Referring now to FIG. 2, which illustrates the preferred embodiment of the present invention, and wherein the radiated power and reflected energies should be understood as being at rf. The four-horn diamond feed 32, 34, 36 and 38 is formed by the orthogonal horn pairs 32, 34 and 36, 38. Top and bottom horns 32 and 34 are powered by a separate feed line which includes the power amplifier 40, TR device 42 and hybrid junction 44. The pair of side horns 36, 38 are also powered by a separate feed line, ie. the power amplifier 46, TR device 48 and hybrid junction 50. Power amplifiers 40 and 46 are connected through a power divider 52 and driven rf amplifier 54 to a stable rf oscillator 56. Oscillator 56, amplifier 54, power divider 52 and power amplifiers 40 and 46 are analogous in function to the transmitter 20 in FIG. 1.

As shown in FIG. 2, the receiver (not shown) is provided with an elevation difference (error) signal from the difference output of the hybrid junction 44, this output being related to the difference of the reflected energies directed into the top and bottom horns 32 and 34. Similarly, the azimuth difference (error) signal is obtained from the difference output of hybrid junction 50 which is related to the difference of the energies in the side horns 36 and 38. The sum signal is obtained from the sum signal output of hybrid junction 58 which is connected to the sum outputs of hybrid junctions 44 and 50.

The readers' attention is particularly directed to the circumstance that the horns 32, 34, 36 and 38 in FIG. 2. can each transmit twice the power transmitted by the horns 12, 14, 16 and 18 in FIG. 1. This is, no doubt, apparent from the consideration that the power passing through each of the TR devices 42 and 48 and through the hybrid junctions 44 and 50 is divided between only a pair of horns 32, 34 or 36, 38 whereas in the arrangement of FIG. 1 the power passing through TR device 22 and hybrid junction 24 is divided between the four horns 12, 14, 16 and 18. The reader should also recognize that while amplifiers 40 and 46 are preferably similar rf power amplifiers, such as klystrons or crossed-field amplifiers, there is no critical phase relationship required in the transmit paths through TR devices 42 and 48 and hybrid junctions 44 and 50 to the orthogonal pairs of horns 32, 34 and 36, 38. Further, as to the rf energy received by the orthogonal pairs of horns 32, 34 and 36, 38, no critical phase relation exists as to the paths through hybrid junctions 44, 50 and TR devices 42, 48 to hybrid junction 58 since this junction derives only the sum signal.

Many variations of the embodiment of the invention shown in FIG. 2 will occur to readers who are skilled in the art of radar design. For example, if operation at half the maximum possible radiated power was desirable, an obvious expedient would be to add waveguide switches that would turn off one of the amplifiers 40 or 46 and cause the other amplifier to energize TR devices 42 and 48 through a power divider similar to the divider 52. It is also obvious that there are many possible arrangements of the invention of FIG. 2 that would involve energies of different polarizations.

There has been disclosed an improved monopulse tracking radar which includes a four-horn diamond feed and two separate feed lines and means that allow the radiated power of the radar to be doubled. Clearly many modifications and variations of the disclosed invention are possible in the light of the above teachings. It is therefore to be understood, that within the scope of the appended claims, the invention may be practiced otherwise than as specifically described.

What is claimed and desired to be secured by Letters Patent of the United States is:

1. A monopulse tracking radar comprising:
   A four-horn diamond antenna feed having a pair of vertically arranged horns and a pair of horizontally arranged horns;
   A source of rf power to be transmitted;
   First feed line means connecting said source of rf power to said pair of vertically arranged horns and including a first TR device and means which provide a signal representative of the elevation angle between a target and the boresight of said radar and
   Second feed line means connecting said source of rf power to said pair of horizontally arranged horns and including a second TR device and means which provide a signal representative of the azimuth angle between a target and the boresight of said radar.

2. The radar of claim 1 and further including sum signal means connected to said first and second TR devices for producing a signal representative of the sum of the reflected energies in all four horns of said diamond antenna feed.

3. The radar of claim 2 wherein said sum signal means includes a hybrid junction.

4. The radar of claim 3 wherein said means which provide signals in said first and second feed lines include hybrid junctions connected between said TR devices and said pairs of horns.

5. A monopulse tracking radar comprising:
   A four-horn diamond antenna feed having a pair of vertically arranged horns and a pair of horizontally arranged horns;
   A source of rf power to be transmitted and
   Separate feed lines connecting said vertically arranged and said horizontally arranged pairs of horns with said source of rf power.

6. A monopulse tracking radar comprising:
   A four-horn diamond antenna feed having a pair of vertically arranged horns and a pair of horizontally arranged horns;
   A source of rf power to be transmitted;
   Power dividing means connected to said rf power source for equally dividing power received from said source;
   First and second power amplifiers connected to said power dividing means to receive said divided power;
   First and second TR devices connected to said first and second power amplifiers;
   First junction means connecting said first TR device to said pair of vertically arranged horns and functioning to pass power to be transmitted and to provide signals representative of the sum and the difference of the target reflected energies in said pair of vertically arranged horns;
   Second junction means connecting said second TR device to said pair of horizontally arranged horns and functioning to pass power to be transmitted and to provide signals representative of the sum and the difference of the target reflected energies in said pair of horizontally arranged horns and
   Third junction means connected to said first and second TR devices for producing a signal representative to the sum of the reflected energies in all four horns of said diamond antenna feed.

* * * * *